United States Patent
Scarborough

(10) Patent No.: US 6,173,502 B1
(45) Date of Patent: Jan. 16, 2001

(54) MAGNETICALLY ENGAGABLE LEVEL SENSING APPARATUS AND STANDOFF

(76) Inventor: Dane Scarborough, P.O. Box 3351, Hailey, ID (US) 83333

(*) Notice: Under 35 U.S.C. 154(b), the term of this patent shall be extended for 0 days.

(21) Appl. No.: 09/228,816

(22) Filed: Jan. 11, 1999

Related U.S. Application Data

(60) Provisional application No. 60/071,174, filed on Jan. 12, 1998.

(51) Int. Cl.$^7$ ..................................................... G01C 9/28
(52) U.S. Cl. ......................................... 33/371; 33/DIG. 1
(58) Field of Search ............................. 33/347, 370, 371, 33/372, 373, DIG. 1

(56) References Cited

U.S. PATENT DOCUMENTS

| | | |
|---|---|---|
| 2,133,605 | 10/1938 | Wikstrom . |
| 2,502,235 * | 3/1950 | Schultes et al. ........................ 33/371 |
| 2,531,563 * | 11/1950 | Feldheim ................................ 33/371 |
| 2,535,791 | 12/1950 | Fluke . |
| 2,553,668 | 5/1951 | Morello . |
| 2,695,949 | 11/1954 | Ashwill . |
| 2,923,552 | 2/1960 | Sundberg . |
| 3,046,672 | 7/1962 | Lace . |
| 3,180,036 | 4/1965 | Meeks, Sr. . |
| 3,213,545 | 10/1965 | Wright . |
| 3,311,988 * | 4/1967 | Manville ................................. 33/372 |
| 3,328,887 * | 7/1967 | Wright .................................... 33/372 |
| 3,820,249 | 6/1974 | Stone . |
| 4,168,578 | 9/1979 | VanderWerf . |
| 4,501,057 * | 2/1985 | Palomera ............................... 33/371 |
| 4,593,475 * | 6/1986 | Mayes .................................... 33/371 |
| 4,970,796 | 11/1990 | Masters et al. . |
| 5,058,407 * | 10/1991 | Parker .................................... 33/371 |
| 5,131,161 * | 7/1992 | Drag ................................. 33/DIG. 1 |

FOREIGN PATENT DOCUMENTS 674060    11/1963  (CA) .

* cited by examiner

Primary Examiner—G. Bradley Bennett
(74) Attorney, Agent, or Firm—Gene Scott-Patent Law & Venture Group

(57) ABSTRACT

A standoff is adapted for mechanical engagement along one side of a level sensing device such as a carpenter's level. The standoff provides a body for interlocking to the level's side by drawing an edge of the level into a V-notch in the standoff so that surfaces of the standoff and the level are forced into intimate contact, thereby aligning the two parts. The standoff provides a magnet and U-shaped magnet support for enabling the standoff to magnetically engage any iron bearing surface such as a steel construction stud or an iron or steel pipe. The U-shaped magnet support is configured for accepting a round surface so that the level sensing device may be used to detect level and plumb conditions on both flat as well as round surfaced objects.

12 Claims, 3 Drawing Sheets

MAGNETICALLY ENGAGABLE LEVEL SENSING APPARATUS AND STANDOFF

This application claims the filing date of a previously filed provisional application having Ser. No. 60/071,174 and an assigned filing date of Jan. 12, 1998 and which contains subject matter identical to the present application.

BACKGROUND OF THE INVENTION

1. Field of the Invention

This invention relates generally to carpenter's levels, and more particularly to a standoff system for such a level, the system enabling the level to be engaged magnetically to a metal stud, pipe or the like for more convenient use of the level especially on vertical surfaces where the level can be engaged with the surface simply by placing it on the surface.

2. Description of Related Art

The following art defines the present state of this field:

Lemile, U.S. Pat. No. 676,330 describes improvements in the construction of spirit-levels, more especially the manner of mounting the level or glass or vial, and to enable the latter to be readily adjusted vertically from the exterior and to cushion the same.

James, U.S. Pat. No. 778,130 describes improvements in spirit levels, and the object is to provide an improved construction of spirit-level having simple and effective means for attaching the liquid-tube to the support and conveniently adjusting the same.

McCain, U.S. Pat. No. 808,862 relates to leveling and plumbing instruments, and it consists of a chambered bar provided with a pivoted spirit-level and a shaft and cam for adjusting the same to an extent indicated by a pointer on the shaft.

Oswald, U.S. Pat. No. 935,807 describes an improvement in the construction of spirit level attachments, and to provide a simple, inexpensive and efficient device of this character capable of ready adjustment to arrange the bubble tubes in proper position with relation to the instrument, and adapted to permit a bubble tube to be readily removed and replaced by a new tube, should the bubble tube be broken or otherwise impaired through rough handling of the instrument.

Lofberg, U.S. Pat. No. 1,012,668 describes improvements in levels and has for its object the provision of an improved level of simple construction and efficient operation.

Ellison, U.S. Pat. No. 1,298,024 describes a spirit level which may be easily and readily applied to or detached from a level-stock, so that bricklayers, masons, or other artisans who use such leveling instruments may carry the spirit level to and from their work and apply the same to any suitable level-stock.

Hubbard, U.S. Pat. No. 2,487,245 relates to a level of the type used by carpenters, bricklayers, and other workmen erecting buildings and other structures which must be kept perpendicularly and horizontally accurate. If such levels are not carefully handled the casings or rings holding bubble glasses are liable to move out of their proper positions and the level will not be accurate.

Scheyer, U.S. Pat. No. 4,774,767 describes a water level or spirit level having at least one water level member whose angular adjustment relative to the contact surface can be changed. The water level member is rotatably mounted on the level body or a structural part fixedly connected to the level body. The water level member is fixable in the desired angular position relative to the level body or the structural parts connected to the level body. The rotatable water level member has at least one circumferentially extending flange which engages under a clamping jaw. The clamping jaw can be pressed against the surface of the flange by means of a manually operated clamping member.

Dengler, U.S. Pat. No. 4,860,459 describes a bubble level with a hollow metal section that has a circular window, in which a cylindrical level tube for a vertical level can be inserted with a positive interlock in the axial direction and can be fastened with a material interlock. A level support is inserted into the hollow section in the axial direction. The support has a cylindrical seat aligned with the window, to receive a level holder that bears a level. An interlock device is disposed between the level support and the level holder. By means of this interlock device, the level holder is mounted axially fixed, but rotatable until it is fastened by the material interlock.

Bird et al, U.S. Pat. No. 4,999,921 describes an adjustable spirit level having a plurality of spirit levels therein. A first spirit level measures vertical orientation, a second adjustable spirit level is adjustable to a true horizontal position, and a third spirit level is adjustable to any desired position between vertical and horizontal. The second level may be adjusted with a rotatable cam-shaped end piece secured within the level body, while the third level is ratcheted to a predetermined angle. The third level may be held in place by a spring member biasing the level against the level body.

Tate, U.S. Pat. No. 5,111,589 describes an adjustable plumb level formed from an I beam with wood side panels. A circular hole is formed through the I beam and side panels, within which an indicating mechanism is disposed. The indicating mechanism is easily replaceable so that the present invention can be used as a plumb or a level.

Tate, U.S. Pat. No. 5,177,873 describes an adjustable plumb level having a first gear driven by a second gear. The second gear has a smaller external diameter than does said first gear. The second gear is operatively coupled to first gear so that when an external force causes the second gear to rotate, the first gear also rotates. The first gear includes a straight vial disposed in the center thereof.

The prior art teaches the use of levels with mechanical clamping devices for attaching the level to various surfaces. However, the prior art does not teach the use of a magnetic standoff providing an inclined surface drawing mechanism so as to assure alignment between the standoff and a surface of a level sensing device. The present invention fulfills these needs and provides further related advantages.

SUMMARY OF THE INVENTION

The present invention teaches certain benefits in construction and use which give rise to the objectives described below.

The present invention provides a standoff adapted for mechanical engagement along one side of a level sensing device such as a carpenter's level. The standoff provides a body for interlocking to the level's side by drawing an edge of the level into a V-notch in the standoff so that surfaces of the standoff and the level are forced into intimate contact, thereby aligning the two parts. The standoff provides a magnet and U-shaped magnet support for enabling the standoff to magnetically engage any iron bearing surface such as a steel construction stud or an iron or steel pipe. The U-shaped magnet support is configured for accepting a round surface so that the level sensing device may be used to detect level and plumb conditions on both flat as well as round surfaced objects.

A primary objective of the present invention is to provide a precision level having advantages not taught by the prior art.

Another objective is to provide such a level with magnetic standoff means for accommodating its attachment to flat as well as rounded surfaces of iron bearing materials.

A further objective is to provide a carpenter's level with such a magnetic standoff that is easily attached to, and detached from, the level.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
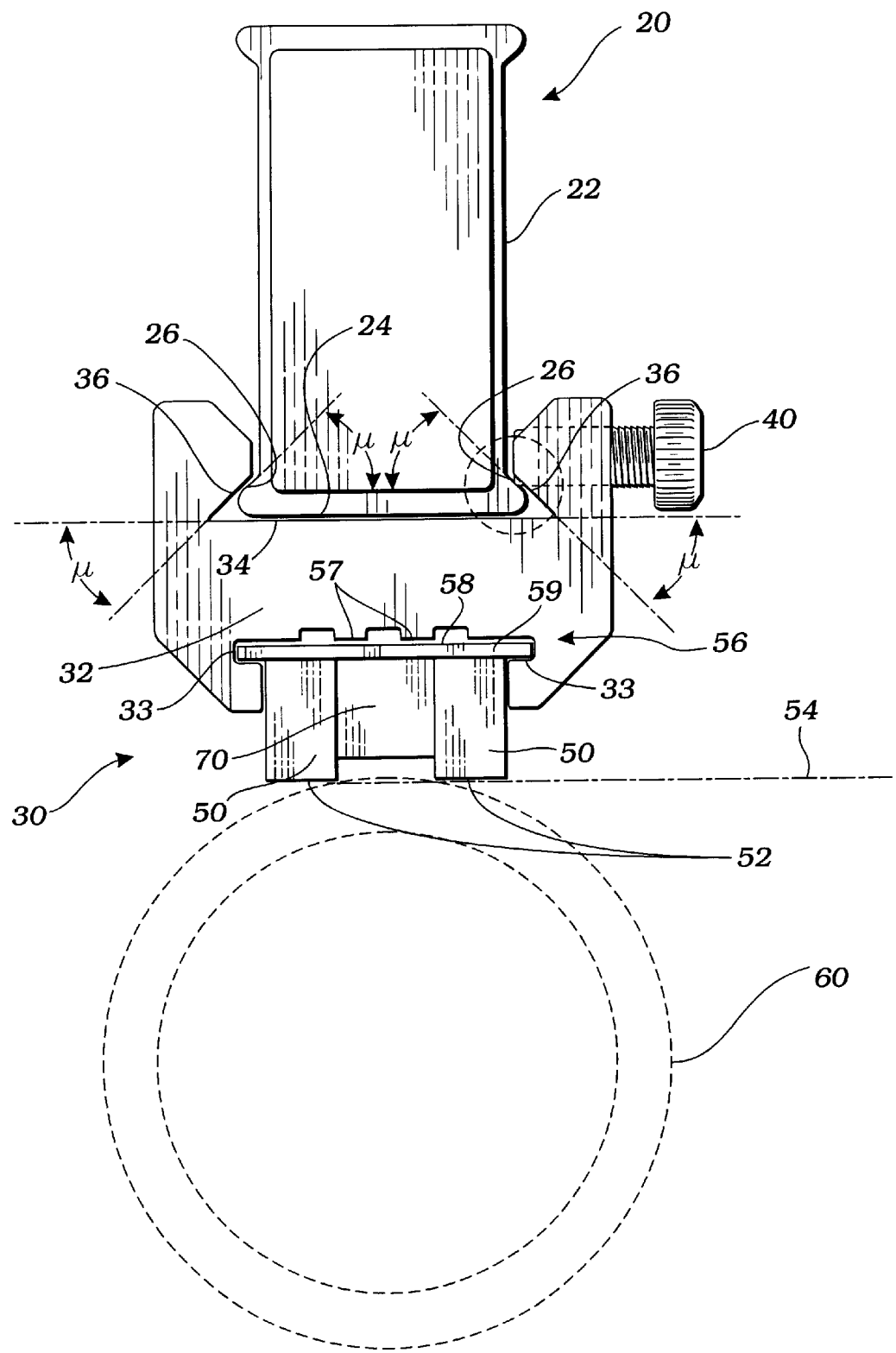
FIG. 1 is a side elevational view of the invention showing the means for joining a box-beam level body to a magnetic standoff.

The above described drawing figures illustrate the invention, a magnetically engagable level sensing apparatus 10 comprising: a level sensing means 20 which may be any carpenter's type level, or any construction level device as is well known in the prior art and having a rigid level housing 22 as might be constructed as a box beam or an "I" or "L" beam, with a level exterior flat surface 24 as is usual for contact with a workpiece to check if the workpiece is near level or near plumb, the surface 24 defined between a pair of parallel, opposing, level angled edge surfaces 26, an acute angle $\mu$ typically, of between 30° and 60° defined between the level exterior flat surface 24 and each one of the level angled edge surfaces 26 and it should be noted that the corners of the level housing 22 are necessarily outcropping angled flanges; a magnetic standoff means 30 which is an assembly comprising a rigid standoff housing 32 preferably of a non-ferrous metal such as aluminum or a fibre composite or structural plastic material, having a standoff exterior flat surface 34 as best shown in FIG. 1, defined between a pair of parallel, opposing, standoff angled edge surfaces 36, preferably an angle near the acute angle, being defined between the standoff exterior flat surface 34 and each one of the standoff angled edge surfaces 36; such that with the level exterior flat surface 24 in contact with the standoff exterior flat surface 34 the pair of level angled edge surfaces 26 are adjacent to, and facing, the standoff angled edge surfaces 36 but necessarily are not tightly fitted thereto; the magnetic standoff means 30 further comprising a clamping means enabled for applying a force to one of the level angled edge surfaces 26, the right surface 26 in FIG. 1, causing the other of the level angled edge surfaces 26, the left surface 26 in FIG. 1, to abut the corresponding one of the standoff angled edge surfaces 36 and to thereby draw the level exterior flat surface 24 and the standoff exterior flat surface 34 into intimate contact for aligning the level sensing means 20 and the magnetic standoff means 30. This occurs because, as seen in FIG. 1, the force applied by a clamping means 40 to the angled surface 26 on the right side, forces the surfaces 24 and 34 together and also moves the level sensing means 20 to shift to the left in FIG. 1. When the surfaces 26 and 36 at the left contact, this causes the surfaces 24 and 34 to be drawn into more intimate contact.

Figure 2:
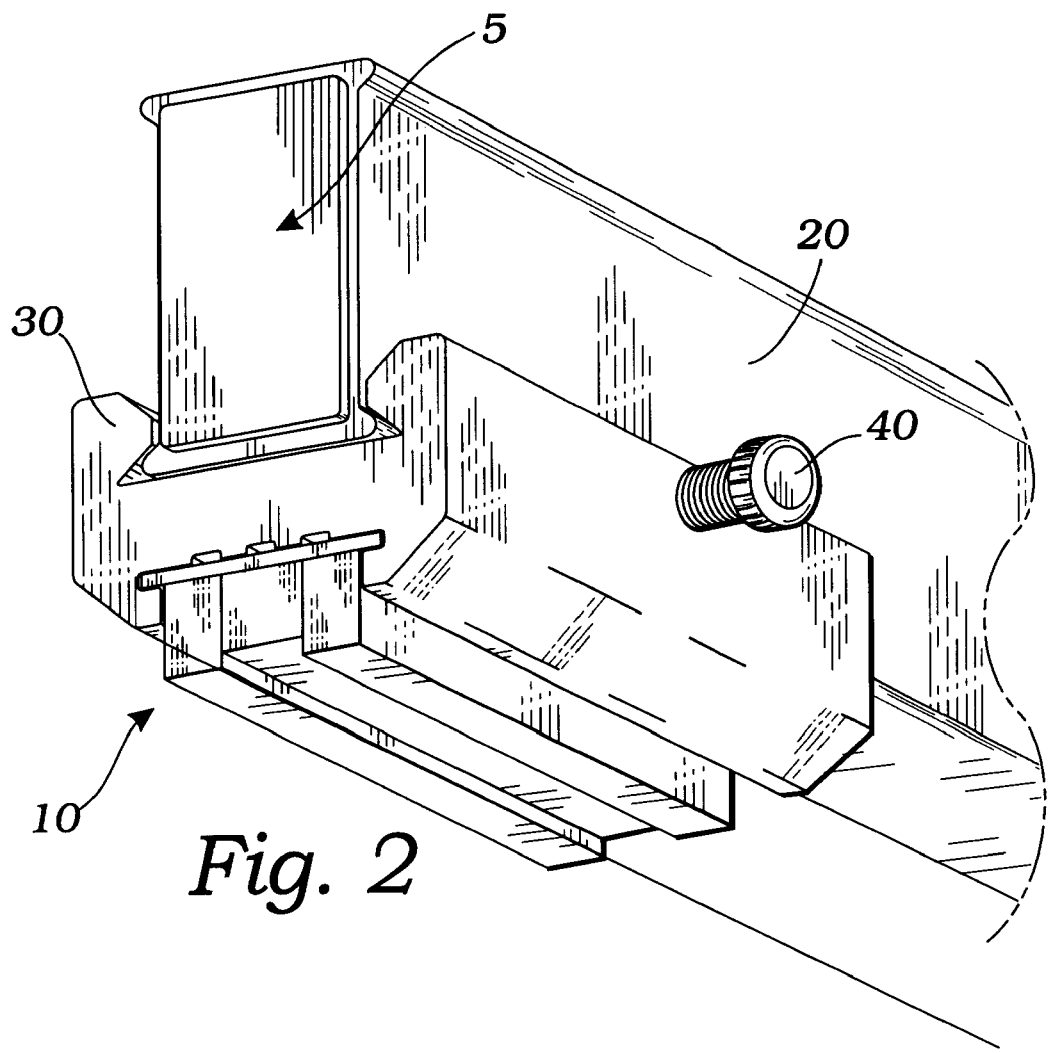
FIG. 2 is a perspective elevational view thereof.
Figure 3:
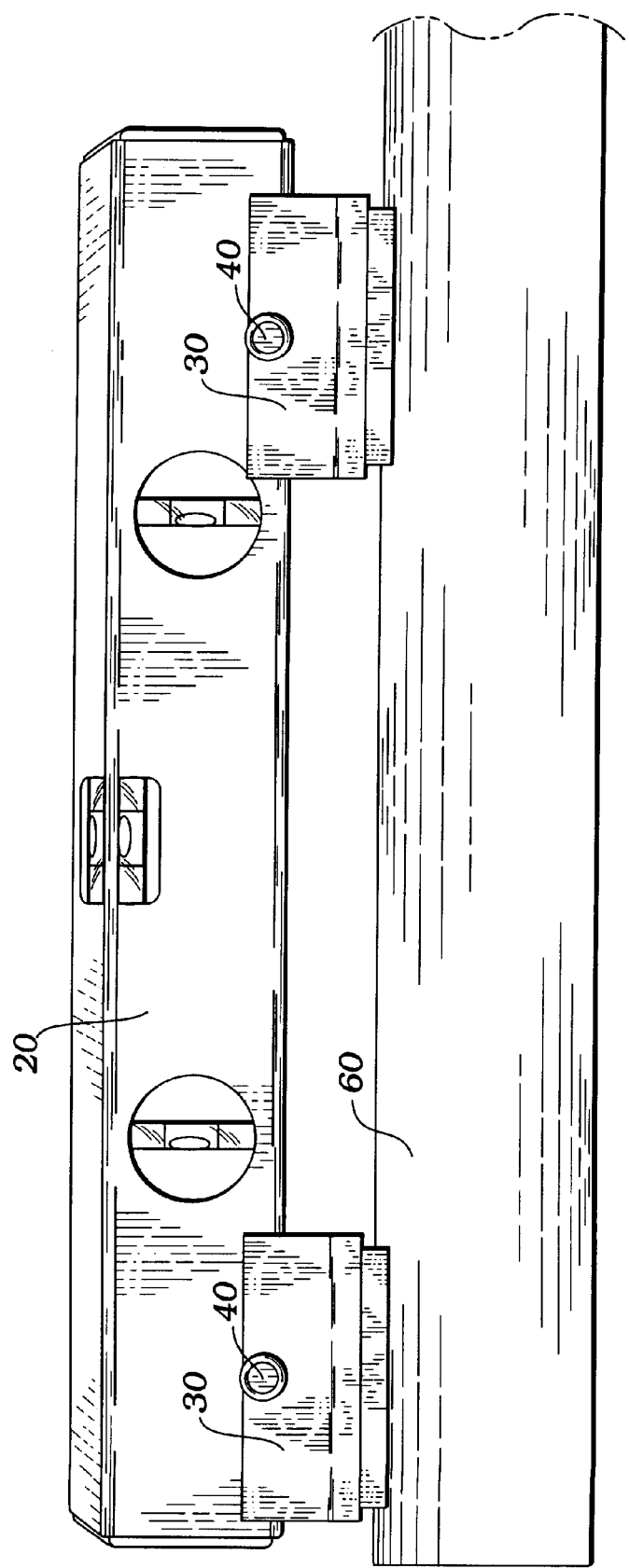
FIG. 3 is a side elevational view thereof.

The magnetic standoff means 30 provides a flat mounting surface means 52, the mounting surface means being functionally parallel to the standoff exterior flat surface 34 such that with the flat mounting surface means 52 in contact with a workpiece surface 60 the level sensing means 20 is positionally oriented for sensing the physical attitude of the workpiece 60, i.e., plumb or level with respect to the gravity vector. The magnetic standoff means 30 further comprises a permanent magnet means 70, such as an alnico bar magnet, adjacent to the flat mounting surface means 52 such that the flat mounting surface means is magnetically attractive to iron bearing materials such as steel parts and structural shapes. The permanent magnet means 70 is sandwiched between a pair of contact bars 50 of a iron bearing alloy such as a steel, the contact bars positioning the flat mounting surface means 52, as a pair of spaced apart contact surfaces laying in a common plane 54. The permanent magnet means 70 and the contact bars 50 are integrally joined, preferably with epoxy bonding agents, to a mounting plate 56 such that a mounting plate surface 58 of the mounting plate 56 is positioned in parallel with the common plane 54, i.e., attached to surface 57. Note the three relief grooves in surface 57 for bonding agents to seek in bonding these parts together. The mounting plate 56 extends laterally to each side of the contact bars 50 to form a pair of opposing mounting plate ears 59 for engaging a pair of opposing grooves 33 of the standoff housing, the mounting plate ears 59 and the grooves 33 being aligned in parallel juxtaposition with the standoff exterior flat surface 34 so as to position the flat mounting surface means 52 of the contact bars 50 co-parallel thereto. The clamping means 40 is preferably a thumbscrew in threaded engagement with the standoff housing 32 but may be any simple mechanical means for applying a normally directed force to one of the standoff angled edge surfaces 36. It should be noted that all of the surfaces 24, 34, 57, 58, and 52 are parallel to each other and to the common plane 54. Preferably, the flat mounting surface means 52, as described above is divided into two separate surfaces as shown in FIG. 1 and extends outwardly from the permanent magnet means 70 so that the standoff means 30 may be placed onto a round work surface as shown in FIG. 1. In use, the standoff means 30 is easily placed into contact with a flat surface, which may be represented by the phantom line (reference numeral 54) in FIG. 1, or may be placed onto a round surface as represented by the dashed line (reference numeral 60) in FIG. 1. Clearly, the present invention is represented by the magnetic standoff means 30 by itself as interpreted by claims 7–12 below, and may also be represented as a combination of a level sensing means 20 of the type described above, with the magnetic standoff means 30 since the level is required to provide surfaces 26. Preferably, in use the level sensing means 20 is used with two or more of the magnetic standoff means 30 as is shown in FIG. 3. The simple method of assembly of the combination is most clearly shown in FIG. 2 wherein the magnetic standoff assemblies 30 are engaged with the level 20 by placing the standoff assemblies 30 onto the surfaces 26 of the level 20 from one end 5, and after positioning the standoff assemblies 30 as desired, tightening the clamping means 40 of each standoff assembly 30 to simultaneously align all of the critical surfaces in parallel and to prevent the standoff assemblies from moving after being tightened.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A magnetically engagable level sensing apparatus comprising:

a level sensing means comprising a rigid level housing having a level exterior flat surface defined between a pair of parallel, opposing, level angled edge surfaces, an acute angle $\mu$ defined between the level exterior flat surface and each one of the level angled edge surfaces;

a magnetic standoff means comprising a rigid standoff housing having a standoff exterior flat surface defined between a pair of parallel, opposing, standoff angled edge surfaces, the acute angle $\mu$ defined between the standoff exterior flat surface and each one of the standoff angled edge surfaces;

such that with the level exterior flat surface in contact with the standoff exterior flat surface the pair of level angled edge surfaces are adjacent to, and facing, the standoff angled edge surfaces;

the magnetic standoff means further comprising a clamping means positioned and enabled for applying a force to one of the level angled edge surfaces, thereby causing the level sensing means to move such that the other of the level angled edge surfaces and the level flat surface are wedged between the corresponding one of the standoff angled edge surfaces and the standoff exterior flat surface thereby aligning the level sensing means and the magnetic standoff means.

2. The apparatus of claim 1 wherein the magnetic standoff means provides a flat mounting surface, the mounting surface being functionally parallel to the standoff exterior flat surface such that with the exterior flat surface in contact with a workpiece surface the level sensing means is positionally oriented for sensing levelness of the workpiece.

3. The apparatus of claim 2 wherein the magnetic standoff means further comprises a permanent magnet adjacent to the flat mounting surface such that the flat mounting surface is magnetically attractive to iron bearing materials.

4. The apparatus of claim 3 wherein the permanent magnet is sandwiched between a pair of contact bars, the contact bars positioning the flat mounting surface as a pair of spaced apart contact surfaces laying in a common plane.

5. The apparatus of claim 4 wherein the permanent magnet and the contact bars are integrally joined to a mounting plate such that a mounting plate surface of the mounting plate is positioned in parallel with the common plane, the mounting plate extending laterally to each side of the contact bars to form a pair of opposing mounting plate ears for engaging a pair of opposing grooves of the standoff housing, the mounting plate ears and the grooves being aligned in parallel juxtaposition with the standoff exterior flat surface so as to position the flat mounting surface of the contact bars co-parallel thereto.

6. The apparatus of claim 1 wherein the clamping means is a thumbscrew in threaded engagement with the standoff housing.

7. A magnetically engagable standoff apparatus for a level sensor, the apparatus comprising:

a magnetic standoff means comprising a rigid standoff housing having a standoff exterior flat surface defined between a pair of parallel, opposing, standoff angled edge surfaces, an acute angle $\mu$ defined between the standoff exterior flat surface and each one of the standoff angled edge surfaces;

the standoff exterior flat surface for contacting a level exterior flat surface of a level sensing means, the standoff angled edge surfaces for facing, in adjacency, a pair of level angled edge surfaces of the level sensing means;

the magnetic standoff means further comprising a clamping means engaged so as to apply a force to one of the level angled edge surfaces of the level sensing means, for enabling the other of the standoff angled edge surfaces to abut a corresponding one of the level angled edge surfaces of the level sensing means thereby drawing the level exterior flat surface of the level sensing means and the standoff exterior flat surface into intimate contact thereby aligning the level sensing means and the magnetic standoff means.

8. The apparatus of claim 7 wherein the magnetic standoff means provides a flat mounting surface, the mounting surface being functionally parallel to the standoff exterior flat surface such that with the exterior flat surface in contact with a workpiece surface the level sensing means is positionally oriented for sensing levelness of the workpiece.

9. The apparatus of claim 8 wherein the magnetic standoff means further comprises a permanent magnet adjacent the flat mounting surface such that the flat mounting surface is magnetically attractive to iron bearing materials.

10. The apparatus of claim 9 wherein the permanent magnet means is sandwiched between a pair of contact bars, the contact bars positioning the flat mounting surface as a pair of spaced apart contact surfaces lying in a common plane.

11. The apparatus of claim 10 wherein the permanent magnet and the contact bars are integrally joined to a mounting plate such that a mounting plate surface of the mounting plate is positioned in parallel with the common plane, the mounting plate extending laterally to each side of the contact bars to form a pair of opposing mounting plate ears for engaging a pair of opposing grooves of the standoff housing, the mounting plate ears and the grooves being aligned in parallel juxtaposition with the standoff exterior flat surface so as to position the flat mounting surface means of the contact bars co-parallel thereto.

12. The apparatus of claim 1 wherein the clamping means is a thumbscrew in threaded engagement with the standoff housing.

* * * * *